United States Patent [19]

Moffett, Jr.

[11] Patent Number: 5,031,359
[45] Date of Patent: Jul. 16, 1991

[54] GARDEN STRUCTURE AND METHOD OF PRODUCING SAME

[76] Inventor: F. Wesley Moffett, Jr., 944 Allens Creek Rd., Rochester, N.Y. 14618

[21] Appl. No.: 717,472

[22] Filed: Mar. 28, 1985

Related U.S. Application Data

[63] Continuation of Ser. No. 550,296, Nov. 9, 1983, abandoned.

[51] Int. Cl.⁵ ............................................. A01G 9/02
[52] U.S. Cl. ........................................... 47/83; 47/82
[58] Field of Search .................... 47/66, 73, 80, 82, 83, 47/86; 220/23.4; 264/536

[56] References Cited

U.S. PATENT DOCUMENTS 3,028,991  4/1962  Scott et al. ......................... 220/23.4
3,198,375  8/1965  Hunter ................................. 264/536
4,170,082  10/1979  Freedman ........................... 220/23.4
4,733,445  1/1979  Mandelbaum ..................... 220/23.4

Primary Examiner—Danton D. DeMille
Assistant Examiner—Bradley Lewis
Attorney, Agent, or Firm—Cumpston & Shaw

[57] ABSTRACT

A garden structure is disclosed for producing a vertically oriented garden. The garden structure comprises a preferably molded, unitary elongated enclosure for holding a growing medium. The enclosure has a central hollow body member of a uniform cross-sectional area and peripheral shape, and bottom and top end portions at opposite ends of the enclosure. Each end portion has a peripheral shape substantially the same as the body member, and is of a reduced cross-sectional area to form bottom and top shoulders at the junction of the end portions and body member. The top portion containing the top shoulder is severed from the body member, reversed and mounted on the severed end with the top shoulder in engagement therewith to form a tray cover.

21 Claims, 5 Drawing Sheets

GARDEN STRUCTURE AND METHOD OF PRODUCING SAME

This is a continuation of co-pending application Ser. No. 550,296 filed on Nov. 9, 1983, now abandoned.

BACKGROUND OF THE INVENTION

1. Field of the Invention

This invention relates generally to garden structures, and more specifically to an improved, simplified vertical garden structure and method of producing same.

2. Description of the Prior Art

Garden structures for producing vertically oriented gardens are generally well known in the art of which U.S. Pat. Nos. 4,161,085; 4,065,876 and 1,752,597 are exemplary.

U.S. Pat. No. 4,161,085, by the same inventor as the inventor of the present invention, describes a garden structure comprising a flexible sheet of plastic having plant openings extending therethrough. The sheet, when vertically arranged, forms a vertically extending first endless wall enclosure of varying cross-section for receiving a quantity of growing medium. A cover slip is releasably attached to each opening for covering the opening to prevent the escape of medium and moisture from the enclosure. The cover slips are detachable from the openings to allow embedding seeds or plants in the growing medium for growth through the openings. A second endless wall enclosure similar to the first enclosure is mountable in vertical registry with the first enclosure and secured thereto by strip weaving or by a plurality of connecting clips. A watering member is placed in the medium adjacent the upper end of the uppermost enclosure for watering the medium. The uppermost enclosure is preferably provided with a cover, and the lowermost enclosure is preferably mounted on a bottom support member.

U.S. Pat. No. 4,065,876, also by the same inventor as the inventor of the present invention, describes a portable garden structure which in one form comprises a rigid support enclosed in a large plastic bag containing soil. The support has a large circular base and a support mast extending upwardly through the center of the soil and out of the top of the bag. The base of each support has an axial bore into which the upper end of the mast of another support can be inserted to stack this form of garden one upon the other. Small holes are cut in the liner or bag, and seeds or plants are planted in the exposed soil so that their sprouts can grow out of the holes.

U.S. Pat. No. 1,752,597 is of interest in disclosing a support post mounted in the ground for supporting a vertical garden structure. The base of the garden structure has a central blind bore for receiving the free end of the support post.

SUMMARY OF THE INVENTION

In accordance with this invention, there is provided an improved garden structure of simple design and construction for producing vertically oriented gardens. The garden structure comprises a unitary, preferably molded enclosure for holding a growing medium and having a central hollow body member of a substantially uniform cross-sectional area and peripheral shape throughout its length. The enclosure further has bottom and top closed end portions at opposite ends of the enclosure, each of a peripheral shape substantially the same as the peripheral shape of the body member, and of a reduced cross-sectional area to form bottom and top shoulders at the junctions of the body member and end portions. A tray cover is formed for the enclosure by severing the top end portion containing the top shoulder, reversing it and seating it on the severed end of the body member with the top shoulder engaging the severed end. The body member and tray cover have spaced plant openings, and detachable cover slips for the openings to prevent the escape of growing medium and moisture therefrom. The cover slips are detached to allow embedding seeds or plants in the growing medium for growth out of the openings, as well as to provide for root growth between adjacent garden structures. Water and fertilizer are introduced into the tray cover and trickle through the plant openings in the tray cover into and through the growing medium where they are absorbed.

A constant and continuing problem in parts of the world today, particularly in the so-called underdeveloped nations of the world, is the lack of water and/or tillable soil. Even in those nations where there are no apparent food shortages, a large number of people, such as apartment dwellers in cities, for example, have little or no access to tillable soil. These and other problems can be minimized by the simple, inexpensive garden structures of this invention.

The invention and its advantages will become more apparent from the detailed description of the invention presented below.

BRIEF DESCRIPTION OF THE DRAWINGS

The details of this invention will be described in connection with the accompanying drawings, in which.

DETAILED DESCRIPTION OF THE INVENTION

Figure 1:
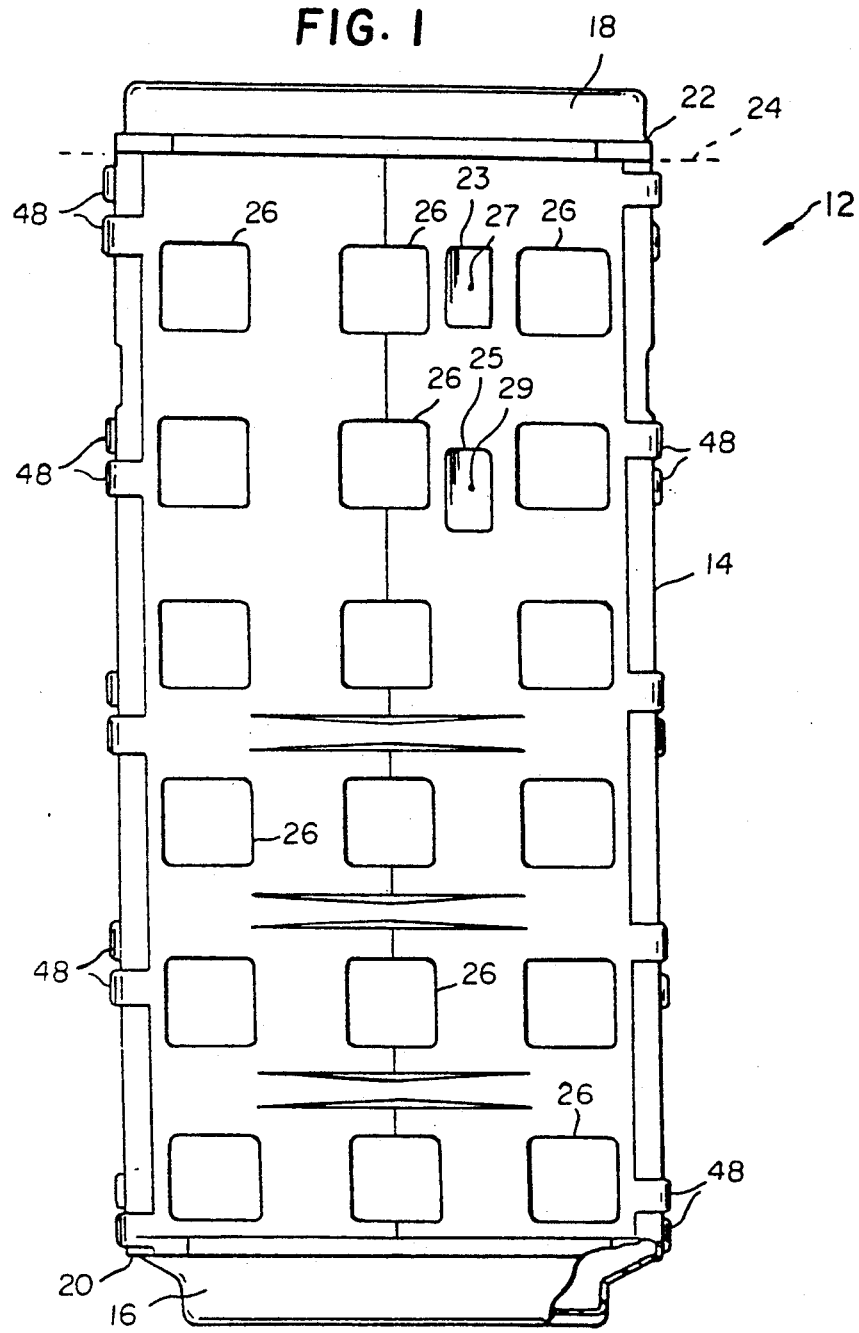
FIG. 1 is a front elevational view of a unitary, preferably molded enclosure for use in constructing a preferred embodiment of a garden structure of this invention.
Figure 8:
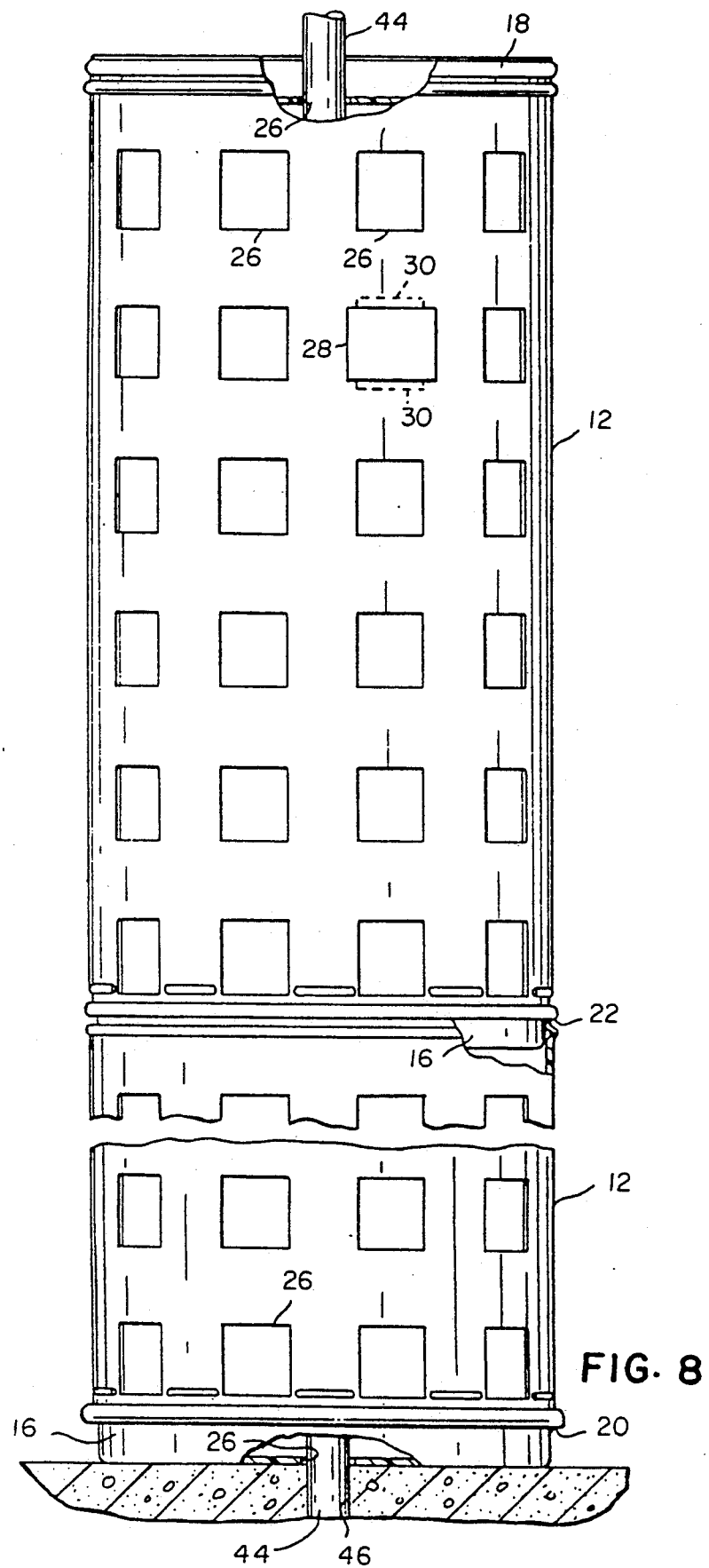
FIG. 8 is a front elevational view similar to FIG. 2 showing a pair of cylindrical garden structures mounted on a central support post, with portions thereof broken away.

With reference to FIG. 1, a unitary, preferably molded enclosure 12 is shown for use in constructing a preferred embodiment of a garden structure of this invention, illustrated in greater detail in FIGS. 2-5. The enclosure 12 comprises a hollow body member 14 of a substantially uniform cross-sectional area and peripheral shape throughout its length. Although the preferred peripheral shape is substantially rectangular, the body member could be formed of any other suitable shape, such as circular, for example, as shown in FIG. 8. The enclosure 12 further comprises bottom and top closed end portions 16, 18 respectively of substantially the same peripheral shape as body member 14, namely rectangular, but of a reduced cross-sectional area for forming bottom and top shoulders 20, 22 respectively where body member 14 and end portions 16, 18 join or merge together.

Figure 2:
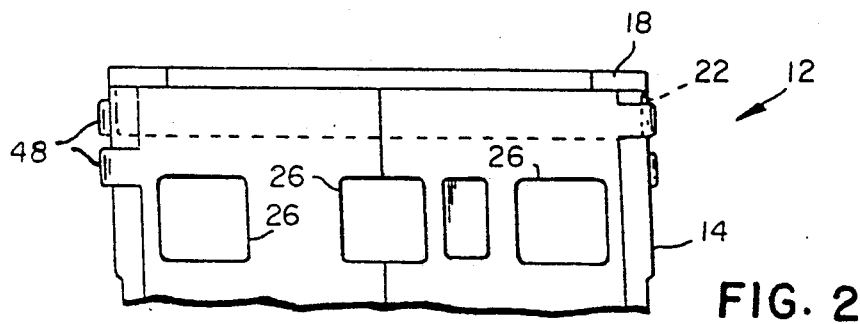
FIG. 2 is a segmented front elevational view showing the upper end of a preferred embodiment of a vertical garden structure constructed from the enclosure of FIG. 1.
Figure 3:
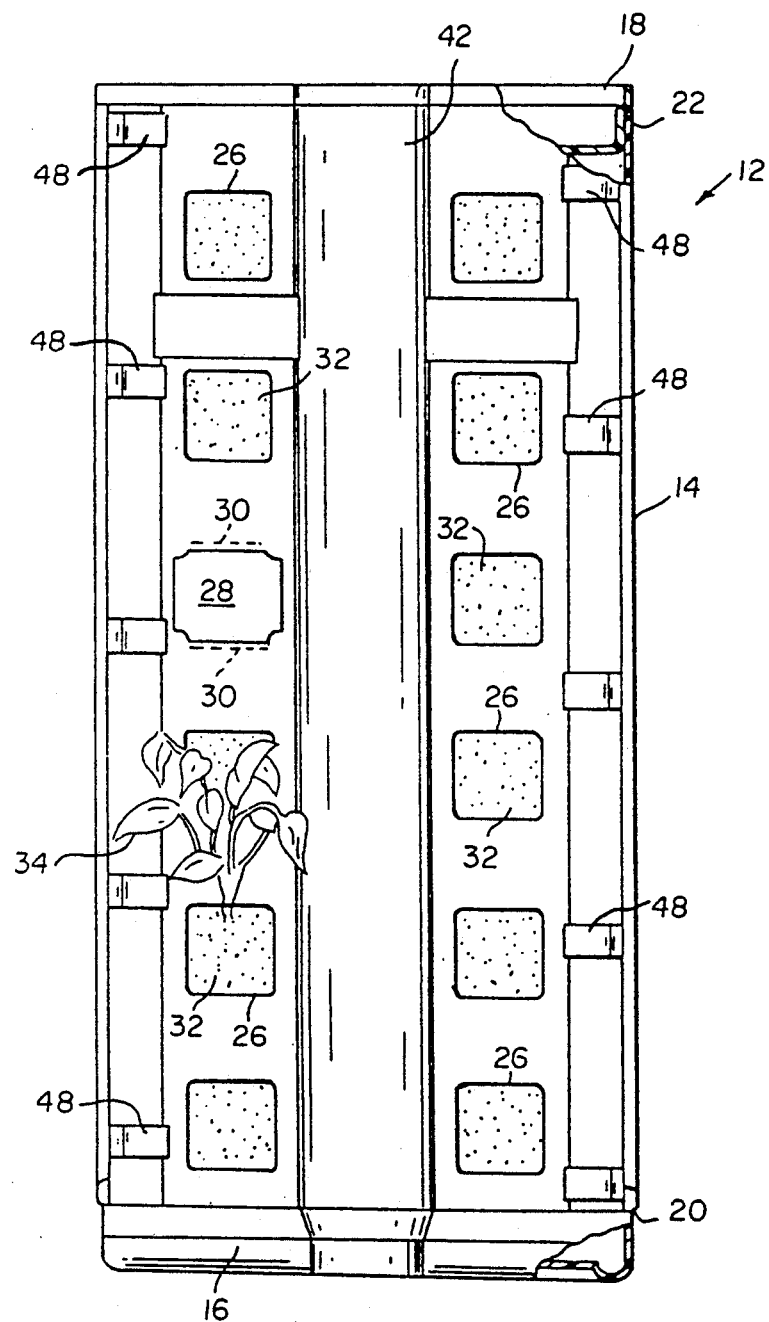
FIG. 3 is a side elevational view with portions thereof broken away of the complete garden structure of FIG. 2.
Figure 4:
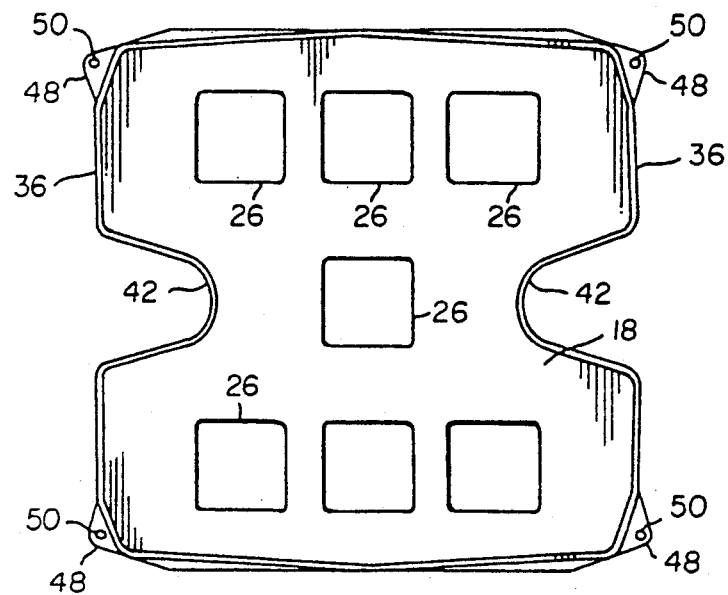
FIG. 4 is a top plan view of the garden structure of FIG. 2.

With reference to FIGS. 1-4, a garden structure is constructed by severing top end portion 18 containing top shoulder 22 from body member 14 substantially along dotted line 24 seen in FIG. 1. The severed top end portion 18 is reversed to form a tray cover and mounted on the severed end of body member 14 with top shoulder 22 engaging or resting on the severed end to form a single garden structure, as seen in FIG. 2. To stack two or more garden structures, the bottom end portion 16 of another enclosure 12 whose top end portion 18 has been severed, is mounted on the severed end of the lower body member 14 with bottom shoulder 20 resting on the severed end, and the tray cover 18 mounted on the severed end of upper body member 14. When two or more stacked garden structures are utilized, water and fertilizer may be introduced into top end portion 18 of the uppermost structure from which they will trickle down into the lower structures.

Figure 6:
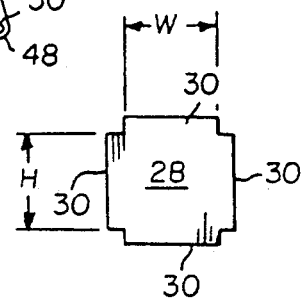
FIG. 6 is a front elevational view of a cover slip for covering a plant opening.
Figure 5:
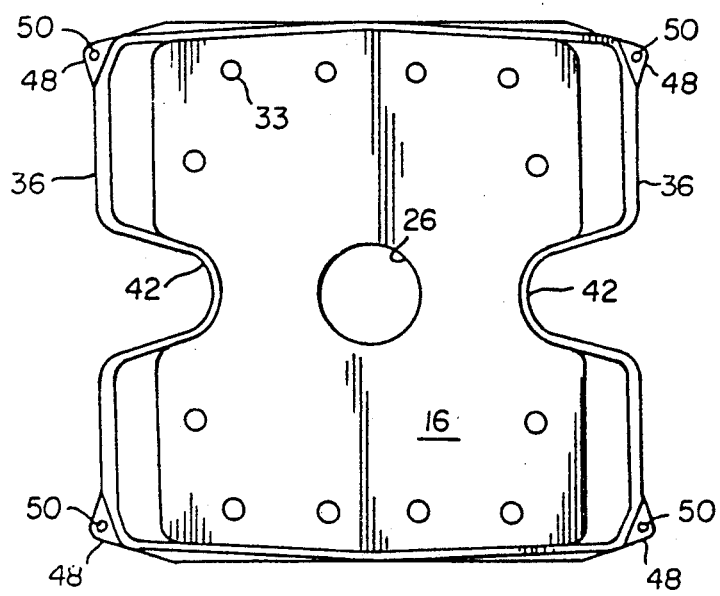
FIG. 5 is a bottom view of the garden structure of FIG. 2.

Body member 14 and top end portion 18 are provided with a plurality of spaced openings 26, as best seen in FIGS. 1-5, to allow access to a growing medium 32 (FIG. 3) such as soil or compost, for example, placed in the body member as explained hereinafter. Bottom end portion 18, as best seen in FIG. 5 is preferably provided with a plurality of relatively small holes 33 to allow water or a water and fertilizer mixture to pass between stacked garden structures while retaining the growing medium in the upper structure. To prevent the growing medium and moisture from escaping through openings 26, cover slips 28 are provided, as shown in FIG. 6, for detachably covering the openings. Each cover slip 28 has a cover portion having a height H and width W substantially equal to the height and width of a complementary opening 26. Each cover slip 28 further includes 4 flaps 30 of a width slightly less than the width of a complementary opening 26. Each cover slip 28 is releasably attached to body member 14 and top end portion 18 by squeezing either the vertically or horizontally opposed flaps 30 toward one another, inserting the flaps 30 from the outside of body member 14 or top end portion 18 through an opening 26, and releasing the flaps causing them to engage the inner side of the body member or top end portion for effectively covering the opening. Body member 14 is also provided with recesses 23, 25 for receiving a handle or the like to facilitate lifting. Preferably, holes 27, 29 are provided within recesses 23, 25 to receive fasteners for holding such handle in position.

Prior to the introduction of growing medium 32 into body member 14, all of the openings 26 therein are preferably covered by cover slips 28. The tray cover 18 is removed, the body member 14 is filled with growing medium 32 through the severed open top, and the cover replaced. When it is desired to plant seeds or a plant 34, the desired number of cover slips 28 are removed and the seeds or plants 34 embedded, preferably by hand, into the accesible growing medium 32. For best results, any seeds planted should be planted near the opening so that the seedlings can easily pass through opening 26 and out of the enclosure into the air and sunlight. At the end of the growing season, the plant stems are cut off, cover slips 28 are replaced, and the plant root material allowed to rot in place enriching the growing medium.

Figures 7, 9:
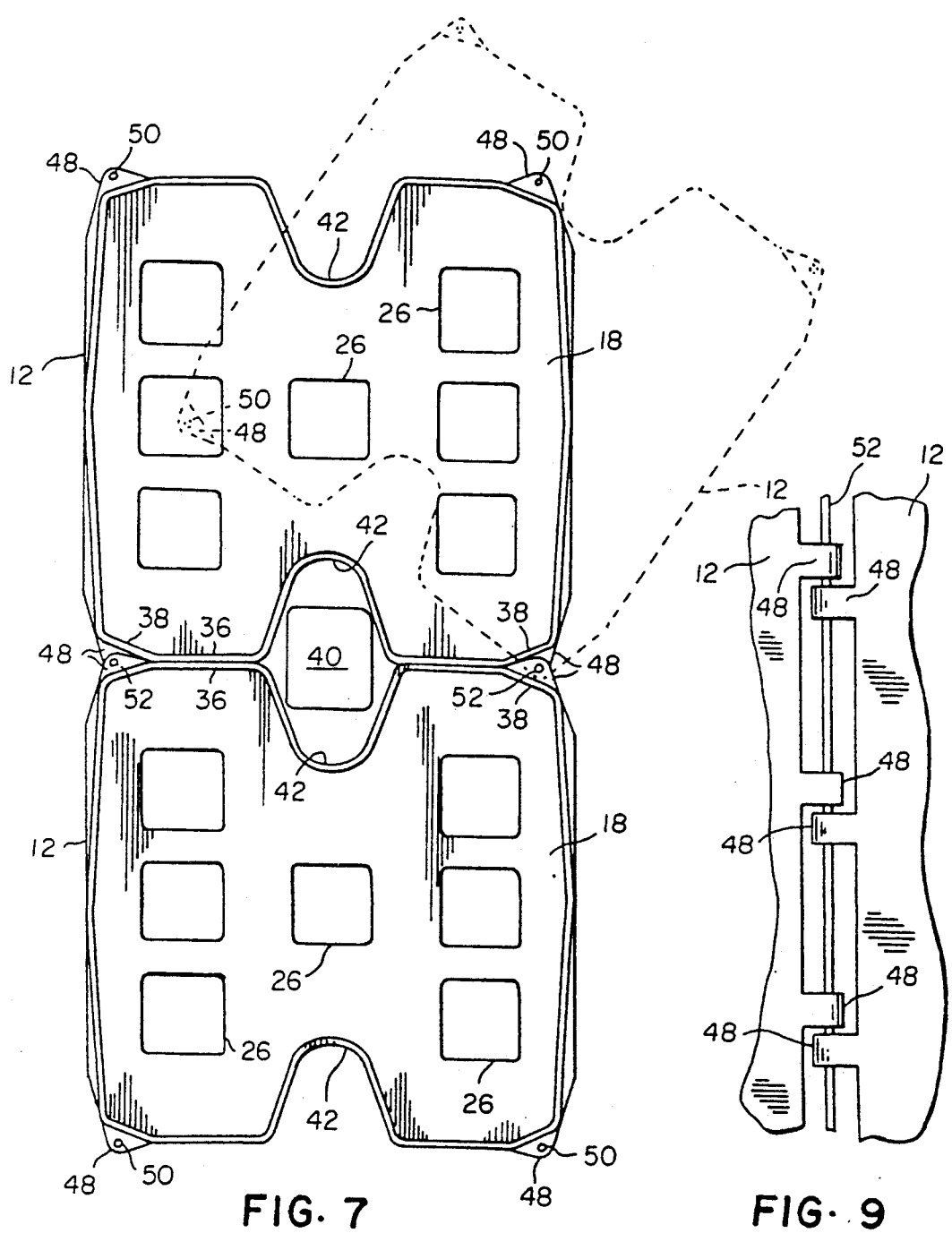
FIG. 7 is a top plan view of a pair of garden structures joined along two corners in full lines, and along a single corner in a dotted position.
FIG. 9 is a partial side elevational view of the pair of garden structures joined as shown in FIG. 7.

With reference to FIGS. 7 and 9, a pair of garden structures 12 are shown with side walls 36 thereof joined in abutting or side-by-side relation. Any number of such garden structures 12 can be joined in side-by-side relation, or along one corner 38 only, as seen in dotted lines, to form long straight or serpentine walls. The garden structures 12 can also be stacked to form walls of any height. When the garden structures 12 are joined in side-by-side relation, cover slips 28 in the adjoining walls 36 are preferably removed so that roots in one garden structure can spread laterally into the adjoining garden structure.

A support system for a wall of garden structures 12 comprises support posts 40 mounted in openings formed by opposed channels 42 in the abutting walls 36 of the garden structures. The posts 40 do not come into contact with the growing medium. The lower ends of the support posts 40 are preferably removably mounted in suitable openings in the ground, not shown, and hence may be easily removed to allow removal and replacement of individual garden structures 12. Also, a single row of stacked garden structures 12, shown as cylindrical, can be supported by a single support post 44, as shown in FIG. 8, extending through central aligned openings 26 in the bottom end portions 16 and tray cover 18 and into an opening 46 in the ground. Where support posts 40 are not necessary, opposed channels 42 may be omitted thereby increasing root communication between adjoining walls 36.

The structure for joining the garden structures 12 in side wall 36 abutting relation, or along one pair of complementary corners 38 only, comprises a plurality of aligned, spaced apart, V-shaped projections 48 laterally extending from each corner 38 of body member 14. Each row of projections 48 along each corner 38 have aligned openings 50 extending therethrough. The projections 48 on diagonally opposed corners 38 are longitudinally aligned with one another along the corners. However, the projections 48 on one pair of diagonal corners 38 are longitudinally offset from the complementary projections 48 on the other pair of diagonal corners 38. Accordingly, when a pair of the garden structures 12 are placed with side walls 36 thereof in abutting relation as seen in FIG. 7, the offset projections 48 and openings 50 therein at the mating corners 38 are moved relative to one another into alignment with one another. The garden structures 12 are joined by inserting rods 52 through the aligned openings 50 in the projections. To provide angular orientation of the garden structures 12, they are joined only along one pair of the corners 38 allowing relative pivotal movement of the garden structures. When two garden structures are stacked, the same rods used to join adjacent structures may be extended to join such stacked vertical structures.

While a presently preferred embodiment of the invention has been shown and described with particularity, it will be appreciated that various changes and modifications may suggest themselves to one having ordinary skill in the art upon being apprised of the present invention. It is intended to encompass all such changes and modifications as fall within the scope and spirit of the appended claims.

What is claimed is:

1. A method for producing a vertically oriented garden structure comprising the steps of:

forming a one piece garden device having a central hollow body portion of a substantially uniform cross-sectional area and peripheral shape throughout its length, and bottom and top closed end portions at opposite ends of said body portion characterized by a peripheral shape substantially the same as said peripheral shape of said body member and of a reduced cross-sectional area and bottom and top shoulders joining said end portions and body portion, said enclosure containing spaced plant openings;

forming a vertically oriented body member by severing said top end portion containing said top shoulder from said body portion to allow the vertically oriented body member to be filled with growing medium through said open severed end of said body member such that a plant seed or plant may be embedded into said growing medium at said plant openings; and reversing said top end portion to form a tray cover, and mounting said cover on said open severed end of said body member with said top shoulder engaging said severed end of said body member.

2. A method for producing a vertically oriented garden structure comprising the steps of:

forming a one piece garden device having a central hollow body portion of a substantially uniform cross-sectional area and peripheral shape throughout its length, and bottom and top closed end portions at opposite ends of said portion characterized by a peripheral shape substantially the same as said peripheral shape of said body portion and of a reduced cross-sectional area and bottom and top shoulders joining said end portions and body portion, said device containing spaced plant openings;

severing said top end portion and said top shoulder from said body portion to form a body member;

covering each of said plant openings with a detachably mounted cover;

filling said body member with growing medium through said open severed end of said body member;

reversing said top end portion to form a tray cover, and mounting said cover on said open severed end of said body member with said top shoulder engaging said severed end of said body member; and detaching said covers to expose the growing medium for receipt of a plant seed or plant.

3. A method for producing a garden structure according to claim 2, and further comprising the step of forming said body portion with a substantially rectangular peripheral shape having four walls and corners with a plurality of first aligned, spaced projections laterally extending from one corner of one wall and having aligned openings extending therethrough, and a plurality of second aligned spaced projections laterally extending from an adjacent corner of said one wall, and having aligned openings extending therethrough, said second projections being laterally offset from said first projections.

4. A method for producing a garden structure according to claim 3, and further comprising the step of forming a pair of said garden devices, and joining body member of said garden devices by aligning said first projections of one body member with said second projections of said other body member, and inserting a rod through said aligned openings in said first and second projections.

5. A method for producing a garden structure according to claim 4, and further comprising the steps of forming each garden device with first projections laterally extending from diagonally opposed corners, and second projections laterally extending from the remaining diagonally opposed corners, placing said body members with a pair of corresponding facing side walls thereof in abutting relation, forming said side walls with channels, and aligning first and second projections on one side wall with second and first projections on the facing wall, and said channel on one side wall with said channel on the facing wall to form an opening for receiving a support post, and inserting rods through aligned openings in said first and second projections for releasably holding said body members together.

6. The method according to claim 5 further comprising removing said detachably mounted covers from adjacent ones of said plant openings in said facing side walls and aligning said plant openings in said facing side walls to permit root communications therethrough.

7. A garden device adapted to be molded in one piece and subsequently divided into a plurality of pieces for assembly and use comprising:

a central hollow body portion characterized by a substantially uniform cross-sectional area and peripheral shape throughout its length;

bottom and top closed end portions at opposite ends of said body portion, each characterized by a peripheral shape substantially the same as said peripheral shape of said body member and of a reduced cross-sectional area; and bottom and top shoulders connecting said end portions to body member;

wherein upon division said plurality of pieces comprises:

a body member having a closed bottom end portion; and a tray cover for said body portion comprising said top end portion containing said top shoulder severed from said body portion, reversed in position and seated on the severed end of said body member with said top shoulder engaging said severed end of said body member.

8. A garden device according to claim 7 wherein said bottom and top end portions have aligned openings for receiving a support post.

9. A garden structure according to claim 7 wherein a pair of identical body members is provided and said bottom end portion of one of said body members is seated in the severed end of the other body member with said bottom shoulder of said one body member engaging said severed end, and said severed top end portion of one of said body members is reversed and seated on said severed end of said one body member with said top shoulder engaging said severed end of said one body member.

10. A garden structure according to claim 9 wherein each of said body members has a substantially rectangular peripheral shape forming four corners, and a plurality of first aligned spaced projections laterally extending from at least one of said corners, said first projections of each of said body members having openings aligned with openings in said projections of said other body member for receiving a rod extending therethrough.

11. A garden structure according to claim 9 further comprising means for passing liquid from said bottom end portion of said one body member to the severed end of said other body member.

12. A garden device according to claim 7 wherein said body portion has a substantially rectangular peripheral shape forming four corners, and a plurality of first aligned spaced projections laterally extending from at least one of said corners, said first projections having aligned openings extending therethrough.

13. A garden device according to claim 12 wherein said body portion has a plurality of second aligned, spaced projections laterally extending from a corner adjacent to said one corner, said second projections further having aligned openings extending therethrough and further being laterally offset along said corner from said first projections.

14. A garden structure according to claim 13 wherein a pair of indentical body members is provided, and said first projections of one of said body members is aligned with said offset second projections of the other of said body members, and a rod is inserted through said aligned openings in said first and second projections.

15. A garden structure according to claim 14 wherein said plant openings in said first body member are aligned with adjacent plant openings in said second body member, and said cover slips for said adjacent plant openings are removed whereby root communication between said body members is facilitated.

16. A garden device according to claim 7 wherein said body member has a substantially rectangular peripheral shape forming four corners, a plurality of first aligned, spaced projections laterally extending from diagonally opposed corners, a plurality of second aligned, spaced projections laterally extending from the remaining diagonally opposed corners, and said first and second projections at respective corners having aligned openings and being laterally offset along said corners from one another.

17. A garden structure according to claim 16 wherein a pair of identical body members is provided and first and second projections on adjacent corners of a side wall of one of said body members are aligned respectively with second and first projections on adjacent corners of a side wall of the other of said body members with said side walls in abutting relation, and rods are inserted through said aligned openings in said first and second projections at said adjacent corners for releasably holding said body members together.

18. A garden structure according to claim 17 wherein said abutting side walls are provided with aligned, facing channels which cooperate to form an opening parallel to said corners for receiving a support post.

19. A garden structure according to claim 17 further comprising at least one further body member seated in the severed shoulder of one of said pair of body members, said further body member being provided with first and second projections aligned with said first and second projections of one of said pair of body members and rods are inserted through aligned openings in at least said projections of said pair of body members and said further body member.

20. A garden structure according to claim 18 wherein said plant openings in said first body member are aligned with adjacent plant openings in said second body member, and said cover slips for said adjacent plant openings are removed whereby root communication between said body members is facilitated.

21. The garden device of claim 1 further comprising:
 plant openings in said body portion and said end portions; and
 a cover slip for detachably covering each plant opening.

* * * * *